United States Patent [19]

Shiratani et al.

[11] Patent Number: 5,440,671
[45] Date of Patent: Aug. 8, 1995

[54] NEURAL NET MODEL AND NEURAL NET OPTIMIZING METHOD AND SYSTEM FOR REALIZING THE SAME

[75] Inventors: Fumiyuki Shiratani; Ikutoshi Fukushima; Takeshi Hashimoto, all of Tokyo, Japan

[73] Assignee: Olympus Optical Co., Ltd., Tokyo, Japan

[21] Appl. No.: 99,648

[22] Filed: Jul. 30, 1993

[30] Foreign Application Priority Data

Jul. 30, 1992 [JP] Japan .................. 4-203605
Oct. 7, 1992 [JP] Japan .................. 4-268485

[51] Int. Cl.$^6$ ............. G06F 15/00; G06G 9/00
[52] U.S. Cl. ............................ 395/25; 364/807; 364/822
[58] Field of Search ............ 395/25; 364/807, 822

[56] References Cited

U.S. PATENT DOCUMENTS

| | | | |
|---|---|---|---|
| 4,651,297 | 3/1987 | Schlunt | 364/822 |
| 4,849,940 | 7/1989 | Marks, II et al. | 395/25 |
| 5,004,309 | 4/1991 | Caulfield et al. | 364/822 |
| 5,095,459 | 3/1992 | Ohta et al. | 395/25 |
| 5,099,434 | 3/1992 | Stoll et al. | 395/25 |
| 5,220,642 | 6/1993 | Takahashi et al. | 395/25 |

OTHER PUBLICATIONS

Psaltis et al, "Optical information processing based on an associative memory model of neural nets with thresholding and feedback", 1985, Optical Society of America.

Farhat et al, "Architectures for optoelectronic analogs of self-organizing neural networks", 1987, Optical Society of America.

Psaltis et al, "Nonlinear Discriminant Functions and Associative Memories", 1986 American Institute of Physics.

*Primary Examiner*—Allen R. MacDonald
*Assistant Examiner*—George Davis
*Attorney, Agent, or Firm*—Cushman, Darby & Cushman

[57] ABSTRACT

A recursive neural net including processing elements (1) each having a linear saturated function as an input-/output function. The elements (1) are divided into a plurality of blocks (2), and the states of the elements (1) are asynchronously updated block by block while being synchronously updated within each block (2). Since convergence is ensured for any symmetric synaptic matrix (W) by selecting a step-size for each particular problem, the neural net can be applied to any optimization problem. In addition, a neural net system is composed of an optical computing unit (201 to 205) performing a vector matrix calculation using light, a threshold processing unit (206) performing a threshold processing operation, a coefficient multiplying unit (209) performing a step-size processing operation, a saturated linear computing unit (207) performing a saturated linear function operation, and a block control unit (208) performing selection of a block to be updated and state updating therefor.

15 Claims, 11 Drawing Sheets

NEURAL NET MODEL AND NEURAL NET OPTIMIZING METHOD AND SYSTEM FOR REALIZING THE SAME

BACKGROUND OF THE INVENTION

The present invention relates to a neural net model used as a method and a system for solving optimization problems, recognition problems, etc. under some constraints. The present invention also relates to a neural net optimizing method and system for realizing the neural net model.

As a neural net for solving optimization problems under some constraints, the Hopfield model is known. In this model, neurons are connected to each other by synapses each having a fixed synaptic weight W, and the respective states of the neurons are sequentially (asynchronously) updated one by one. Therefore, this model has the problem that the processing is not efficient. Accordingly, it has been expected to carry out the processing in parallel and efficiently by performing synchronous state updating.

In the meantime, as a neural net model for synchronous processing, a recursive neural net has been devised, which performs block-sequential state updating in which synchronous and asynchronous operations are jointly used (see Recursive Neural Networks for Associative Memory, pp. 33–35, Wiley). The block-sequential state updating is a processing method in which a network comprising n neurons is divided into m blocks, and while synchronous state updating is being performed within each individual block, state updating is sequentially (asynchronously) performed from the first block to the m-th block. However, this model is a binary model and therefore limited in the application range.

Figure 1:
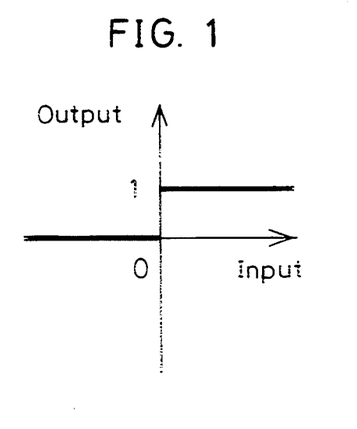
FIG. 1 shows an input/output function in a conventional binary neural net that performs block-sequential state updating.

The recursive neural net model will be explained below. FIG. 1 shows the input/output function in a conventional binary neural net that performs block-sequential state updating.

In the recursive neural net model, the state vector $x=(x_1, \ldots, x_n)^T$, where $x_i=0$ or $1$, is divided into m subvectors $x^{(k)}$ ($k=1, \ldots, m$), and each subvector is updated according to the following expression:

$$X^{(k)}(t+1) = \mathrm{Sgn}\left[\left(\sum_{j=1}^{k-1} W_{kj} x^{(j)}(t+1) + \sum_{j=k}^{m} W_{kj} x^{(j)}(t) + \theta^{(k)}\right)\right] \quad (1)$$

In the above expression (1), $\Theta^{(k)}$ represents subvectors of the threshold vector $\Theta = [\Theta^{(1)T}, \Theta^{(2)T}, \ldots, \Theta^{(m)T}]^T$, and $W_{kj}$ is a submatrix of synaptic weights of the link connecting the j-th block to the k-th block, which is related to the synaptic matrix W by the following expression:

$$W = \begin{bmatrix} W_{11} & W_{12} & \cdots & \cdots & W_{1m} \\ W_{21} & W_{22} & \cdots & & \cdot \\ \cdot & & & & \cdot \\ \cdot & & & & \cdot \\ \cdot & & & & \cdot \\ W_{m1} & W_{m2} & \cdots & \cdots & W_{mm} \end{bmatrix} \quad (2)$$

The Sgn function causes the sgn function defined below to operate for each vector component (the input/output function thereof is shown in FIG. 1):

$$\begin{cases} \mathrm{sgn}(x) = 0 & \text{if } x < 0 \\ \mathrm{sgn}(x) = x & \text{if } x = 0 \\ \mathrm{sgn}(x) = 1 & \text{if } x > 0 \end{cases} \quad (3)$$

With respect to the synaptic matrix W, which is a symmetric matrix, an energy function is defined by:

$$E(t) = -\frac{1}{2} x^T(t) W x(t) - x^T(t) \theta \quad (4)$$

With regard to the energy function, the following has been proved. That is, assuming that the diagonal blocks $W_{kk}$ in the synaptic matrix W are positive definite, i.e., if the following condition is assumed to hold for any subvector $x^{(k)}$:

$$x^{(k)T} W_{kk} x^{(k)} \geq 0 \quad (5)$$

(the equality sign holds only when $x^{(k)}=0$) then, for the energy function, the following condition holds:

$$E(t+1) \leq E(t) \quad (6)$$

(the equality sign holds only when $X(t+1)=X(t)$)

In other words, the energy inevitably decreases with the passage of time. Accordingly, if the given optimization problem is to minimize the evaluation function in the form of the expression (4), it can be solved by applying the above-described neural net as long as the diagonal blocks $W_{kk}$ in the synaptic matrix W are positive definite.

Figure 2:
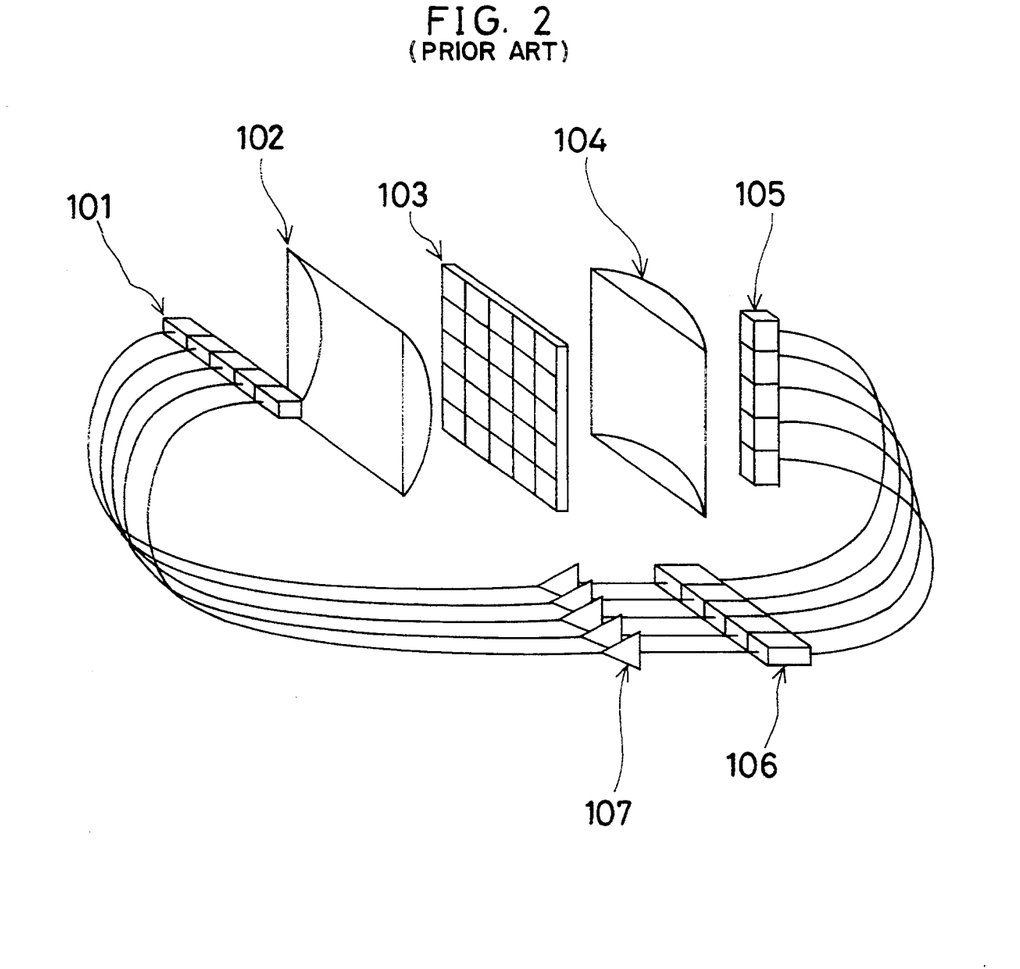
FIG. 2 is a basic conceptual view showing one example of the arrangement of a conventional neural net that optically performs vector matrix calculation.
Figure 3:
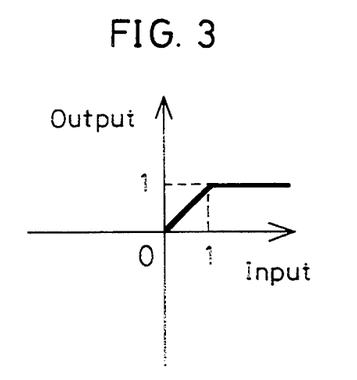
FIG. 3 shows a linear saturated function.

Further, a method of solving optimization problems, recognition problems, etc. by optically performing vector matrix calculation and realizing a neural net has heretofore been known (for example, see The Journal of Applied Optics, Vol. 24, No. 10, pp. 1469–1475, 1985). FIG. 2 is a basic conceptual view showing one example of the arrangement of the conventional neural net, in which an associative memory system is realized by an optical method based on the Hopfield model. In this optical computer system, reference numeral 101 denotes an light-emitting element array, 102 and 104 lenses, 103 an optical mask, e.g., a photographic mask, 105 a photosensor array, 106 a threshold processing unit, and 107 a nonlinear computing unit.

The operation of the above system will be explained below. A sectorial beam of light is applied to the optical mask 103 from the light-emitting element array 101. The light-emitting element array 101 represents a kind of vector $x=(x_1, x_2, \ldots, x_n)$ in which the state is expressed by the intensity of light emitted from each element. The optical mask 103 is divided into $n \times n$ elements. The light transmittance of each element represents a kind of matrix $W=[w_{ij}]$ which expresses the synaptic weight of the link connecting neurons to each other. The photosensor array 105 represents a kind of vector $u=u(u_1, u_2, \ldots, u_n)$. The j-th light-emitting element illuminates the j-th row of the optical mask 103 through the lens system 102, and the sum of light intensities in the i-th column of the optical mask 103 is received by the i-th photosensor through the lens system 104. In this way, it is possible to perform the following vector matrix calculation:

$$u_i = \sum_{j=1}^{n} w_{ij}x_j \quad (7)$$

Next, the signal obtained by the photosensor is input to the threshold processing unit 106 where it is subjected to the following threshold processing:

$$S_i = u_i + \theta_i \quad (8)$$

Further, the value $S_i$ is subjected to nonlinear processing in the nonlinear computing unit 107 as follows:

$$\begin{cases} f(S_i) = 1 & \text{if } S_i \geq 0 \\ f(S_i) = -1 & \text{if } S_i < 0 \end{cases} \quad (9)$$

Then, the resulting signal is fed back to the light-emitting element array 101. Thus, it is possible to realize a Hopfield neural net and find an optimal solution.

However, the above-described binary model that performs block-sequential state updating is limited in the application range because of the imposed condition that the diagonal blocks $W_{kk}$ in the synaptic matrix W must be positive definite. Therefore, it is difficult to apply it to various optimization problems.

In addition, the above-described system, in which a Hopfield neural net is realized by using light, can perform high-speed processing because the vector matrix calculation, which requires the processing time the most, is executed by light. Further, the system needs no complicated wiring, which would be a fatal disadvantage in the case of electrical systems. Thus, the system is excellent. However, it is generally known that since the system performs discrete-time synchronous updating, there are many cases where an oscillating solution occurs and no optimal solution can be obtained. In actual fact, there are many oscillating solutions in the results shown in the aforementioned literature. Thus, there is much room for further improvement.

SUMMARY OF THE INVENTION

It is an object of the present invention to provide a neural net model applicable to various optimization problems and also provide a neural net optimizing method and system for realizing the neural net model.

It is another object of the present invention to provide a neural net model and a neural net system which are applicable to various optimization problems and recognition problems and which enable high-speed convergence to the solution without generating an oscillating solution.

To attain the above-described objects, the present invention provides a block-sequential neural net model of the recursive neural net type in which each processing element has a linear saturated function as an input-/output function. The elements of the neural net are divided into a plurality of blocks, and the states of the elements are sequentially (asynchronously) updated block by block while being synchronously updated within each block.

In addition, the present invention provides a neural net system including an optical computing unit performing a vector matrix calculation using light, a threshold processing unit performing a threshold processing operation, a coefficient multiplying unit performing a step-size processing operation, a saturated linear computing unit performing a linear saturated function operation, and a block control unit performing selection of a block to be updated and state updating therefor.

Figure 4:
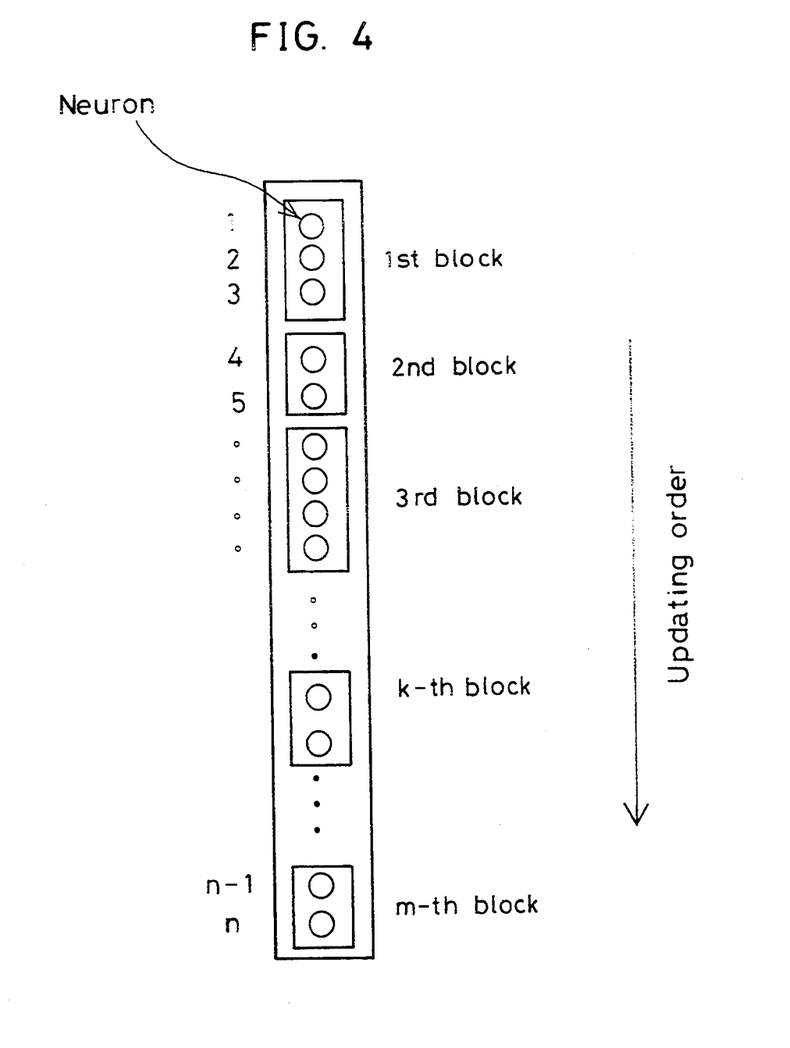
FIG. 4 shows one example of the arrangement of a recursive neural net that performs block-sequential updating.

First, the block-sequential neural net model will be explained with reference to FIG. 4. For simplification of the explanation, let us consider a neural net in which n neurons (elements shown by in the figure) are arranged in a one-dimensional pattern. Let us assume that the neurons in the neural net are connected to each other by synapses (not shown) each having a linear saturated function as input/output characteristics, and that the neurons are divided into m blocks, as shown by the rectangles in the figure.

Assuming that the state of each individual neuron in the neural net is expressed by the state vector $x=(x_1, \ldots x_i, \ldots, x_n)^T$ ($0 \leq x_i \leq 1$) and the states of the neurons included in each block are expressed by m subvectors $x^{(k)}$ (k=1, , ..., m), the state of the block-sequential neural net model is updated according to the following expression:

$$x^{(k)}(t+1) = S\left[x^{(k)}(t) + \alpha_k \left(\sum_{j=1}^{k-1} W_{kj}x^{(j)}(t+1) + \sum_{j=k}^{m} W_{kj}x^{(j)}(t) + \theta^{(k)}\right)\right] = \quad (10)$$

$$S\left[\alpha_k\left(\sum_{j=1}^{k-1} T_{kj}x^{(j)}(t+1) + \sum_{j=k}^{m} T_{kj}x^{(j)}(t) + \theta^k\right)\right]$$

(where $T_{kk} = w_{kk} + 1/\alpha_k$)

In the above expression, $w_{kj}$ and $\Theta^{(k)}$ are the same as those employed in the expressions (1) and (2), and $\alpha_k$ is a step-size for updating of the k-th block, which is a coefficient set under the conditions described later to eliminate an oscillating solution. S is a non-linear operator causing a linear saturated function Sat defined below to operate for each vector component:

$$\begin{cases} \text{Sat}(x) = 0 & \text{if } x < 0 \\ \text{Sat}(x) = x & \text{if } 0 \leq x \leq 1 \\ \text{Sat}(x) = 1 & \text{if } x > 1 \end{cases} \quad (11)$$

In the state updating performed according to the equation (10), the neurons in the k-th block are synchronously (simultaneously) updated, but the neurons in the other blocks are not updated. However, this state updating is sequentially performed from the 1st block to the m-th block and repeated over and over again until the state of the neural net converges. The number of times of updating required in this model is smaller than that in an asynchronous model by a number of times of updating saved by virtue of the synchronous updating carried out in each block.

Here, with respect to a symmetric matrix W, an energy function is defined by $$E(t) = -\frac{1}{2} x^T(t)Wx(t) - x^T(t)\theta \quad (12)$$

If $\alpha_k$ in the equation (10) satisfies the following condition (13) in which $\lambda_k$ is the minimum eigenvalue of the diagonal blocks $w_{kk}$ in the matrix W:

$$\frac{2}{\alpha_k} > \max[-\lambda_k, 0] \quad (13)$$

$$(k = 1, \ldots, m)$$

it is possible to prove that the following condition holds:

$$E(t+1) \leq E(t) \quad (14)$$

(the equality sign holds only when $x(t+1)=x(t)$)

That is, the energy is defined by $$E(x_t) = -\frac{1}{2} x_t^T W x_t - x_t^T \theta \quad (15)$$

Even if the 1st block is assumed to update the state, generality is not lost. Therefore, if the terms are expressed as follows:

$$X_t = \begin{bmatrix} x_t^{(1)} \\ x_t^* \end{bmatrix}, \quad (16)$$

$$x_{t+1} = \begin{bmatrix} x_{t+1}^{(1)} \\ x_{t+1}^* \end{bmatrix},$$

$$W = \begin{bmatrix} W_{11} & V^T \\ V & W^* \end{bmatrix},$$

$$\theta = \begin{bmatrix} \theta^{(1)} \\ \theta^* \end{bmatrix} \quad (16)$$

the expression (15) may be written as follows:

$$E(X_t) = -\frac{1}{2} [X_t^{(1)T} W_{11} x_t^{(1)} + 2x_t^{(1)T} V x_t^* + x_t^{*T} W^* x_t^*] \quad (17)$$

Taking notice that $x_{t+1}^* = x_t^*$, let us change the expression to calculate energy variation as follows:

$$\begin{aligned} E(x_{t+1}) - E(x_t) &= -[x_{t+1}^{(1)t} - x_t^{(1)T}][W_{11}x_t^{(1)} + V^T x_t^* + \theta^{(1)}] - \\ & \quad \frac{1}{2} [x_{t+1}^{(1)T} - x_t^{(1)T} - x_t^{(1)T}] W_{11} [x_{t+1}^{(1)} - x_t^{(1)}] \\ &= -\frac{1}{\alpha_1} [x_{t+1}^{(1)T} - x_t^{(1)T}] [x_t^{(1)} - \\ & \quad x_{t+1}^{(1)} + \alpha_1(W_{11}x_t^{(1)} + V^T x_t^* + \theta^{(1)})] - \\ & \quad \frac{1}{2\alpha_1} [x_{t+1}^{(1)T} - x_t^{(1)T}] (2I_{11} + \\ & \quad \alpha_1 W_{11})[x_{t+1}^{(1)} - x_t^{(1)}] \end{aligned} \quad (18)$$

The first term in the above expression is either negative or 0 according to the state updating rule defined by the following expression (19) and the way of determining the input/output function S:

$$x_{t+1}^{(1)} = S[x_t^{(1)} + \alpha_1(W_{11}x_t^{(1)} + V^T x_t^* + \theta^{(1)})] \quad (19)$$

The second term is either negative or 0 on the assumption that $\alpha_1$ satisfies the following condition:

$$\frac{2}{\alpha_1} > \max\{-\lambda_1, 0\} \quad (20)$$

That is, it is possible to prove that the following condition holds:

$$E(x_{t+1}) \leq E(x_t)$$

Here, the equality sign holds only when $$x_{t+1}^{(1)} = x_t^{(1)}, \text{ that is, } x_{t+1} = x_t$$

Thus, it will be understood that the state of the neural net model performing block-sequential updating converges to the minimal point of the energy function defined by the expression (12), that is, it is possible to obtain the solution without falling into an oscillating solution.

When already-known binary models are used to perform discrete-time block-sequential state updating, problems to which they can be applied are generally limited because the condition that the diagonal blocks $W_{kk}$ must be positive definite is imposed thereon in order to ensure the convergence. In contrast, the above-described continuous valued model enables convergence to be surely reached for any symmetric matrix W without falling into an oscillating solution by setting $\alpha_k$ so that the expression (13) is satisfied. Therefore, it can be applied to any optimization problem given in the form of the expression (12). The present invention has been made on the basis of the finding that the state of the network converges to the minimal point of the energy function defined by the expression (12).

Further, the block-sequential state updating is a more general state updating method that includes asynchronous updating and synchronous updating as operations in special cases of m=n and m=1, respectively. Therefore, the model proposed herein is an even more general method which may be used to solve optimization problems and recognition problems by a discrete-time model.

Figure 5:
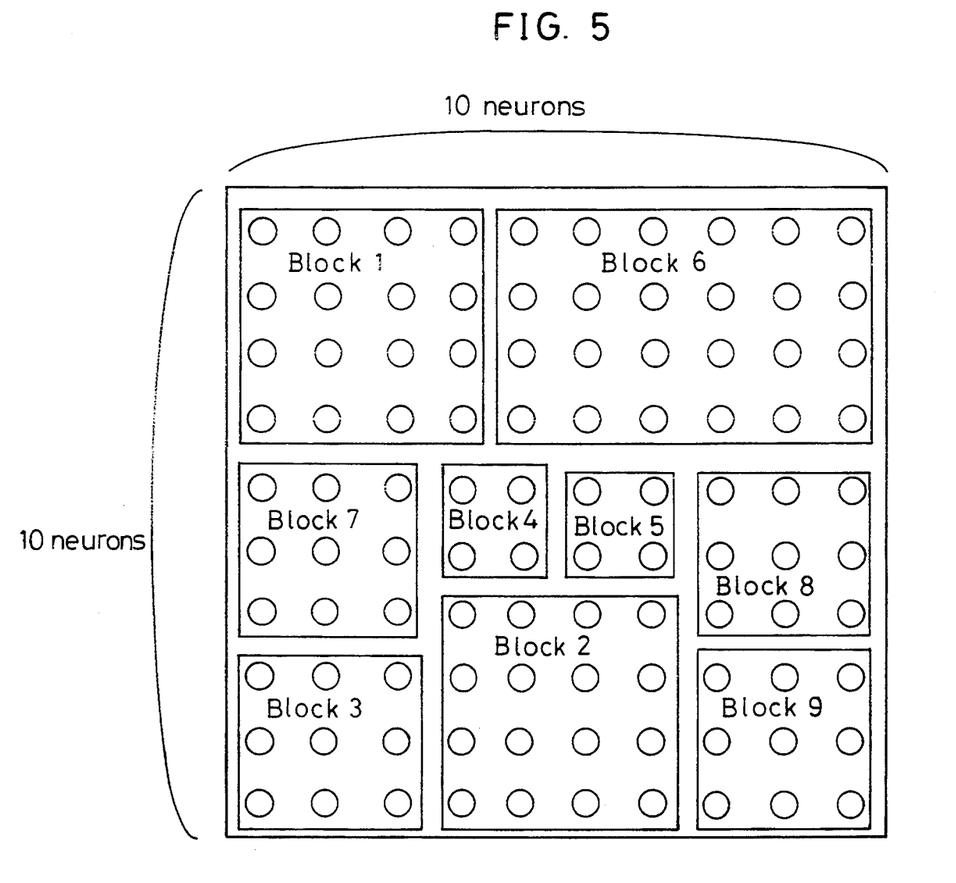
FIG. 5 shows another example of the arrangement of a recursive neural net that performs block-sequential updating.

Although in the foregoing description the neurons are handled in one-dimensional form for simplification of the explanation, it is a matter of course that the neurons may be handled in two-dimensional form, as shown in FIG. 5, or in three- or higher-dimensional form.

The following is a description of a system for realizing the block-sequential neural net model. As has been described above, if this model is realized in the form of an electrical system, some problems arise, i.e., the problem of wiring synapses, and the low processing speed of the vector matrix calculation included in the expression (10). Accordingly, the system of the present invention is arranged to optically execute such processing in the same way as in the above-described prior art to thereby achieve a high-speed operation.

Figure 6:
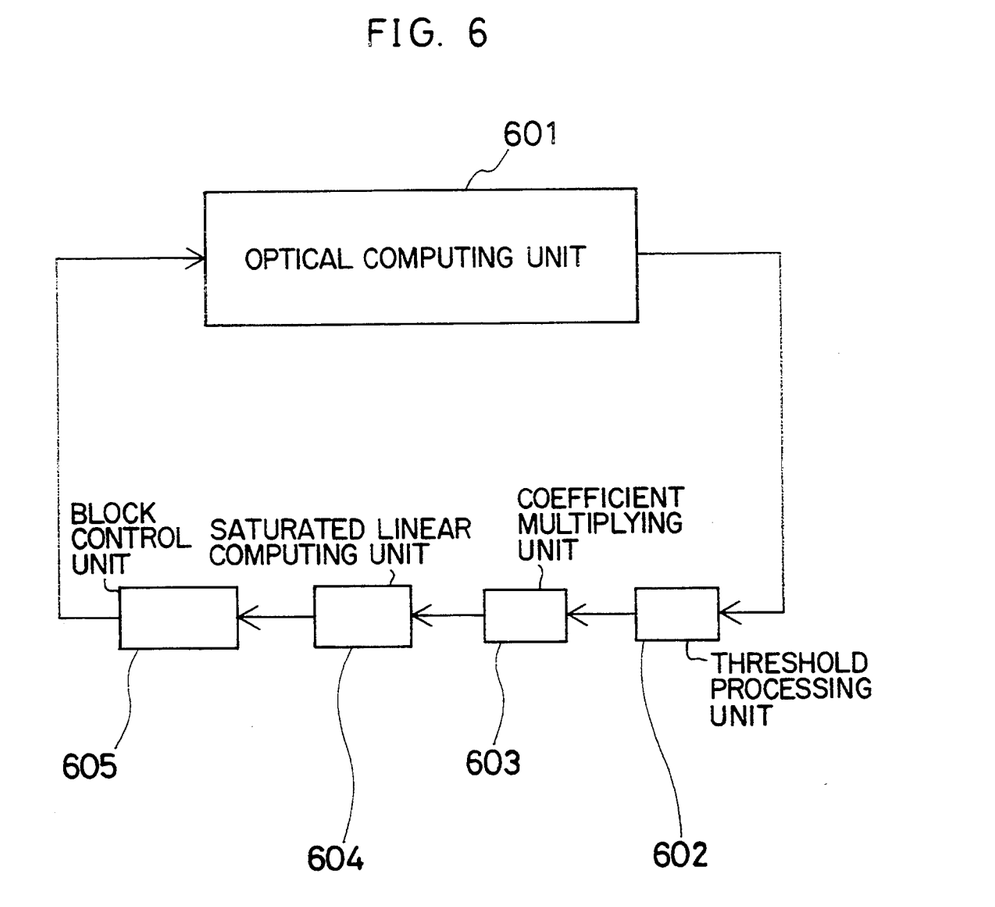
FIG. 6 is a block diagram showing the concept of the recursive neural net according to the present invention.

More specifically, as shown in the conceptual view of FIG. 6, an optical computing unit 601 performs vector matrix calculation for $x^{(j)}$ and $T_{kj}$ included in the expression (10). Then, a threshold processing unit 602 performs a threshold $e^{(k)}$ processing operation, and a coefficient multiplying unit 603 performs a step-size $\alpha_k$ processing operation. Then, a saturated linear computing unit 604 performs a linear saturated function Sat operation. Further, a block control unit 605 selects a block to be updated and updates the state thereof. In this way, the neural net system carries out the state updating shown by the expression (10) to realize the above-described model.

Figure 7:
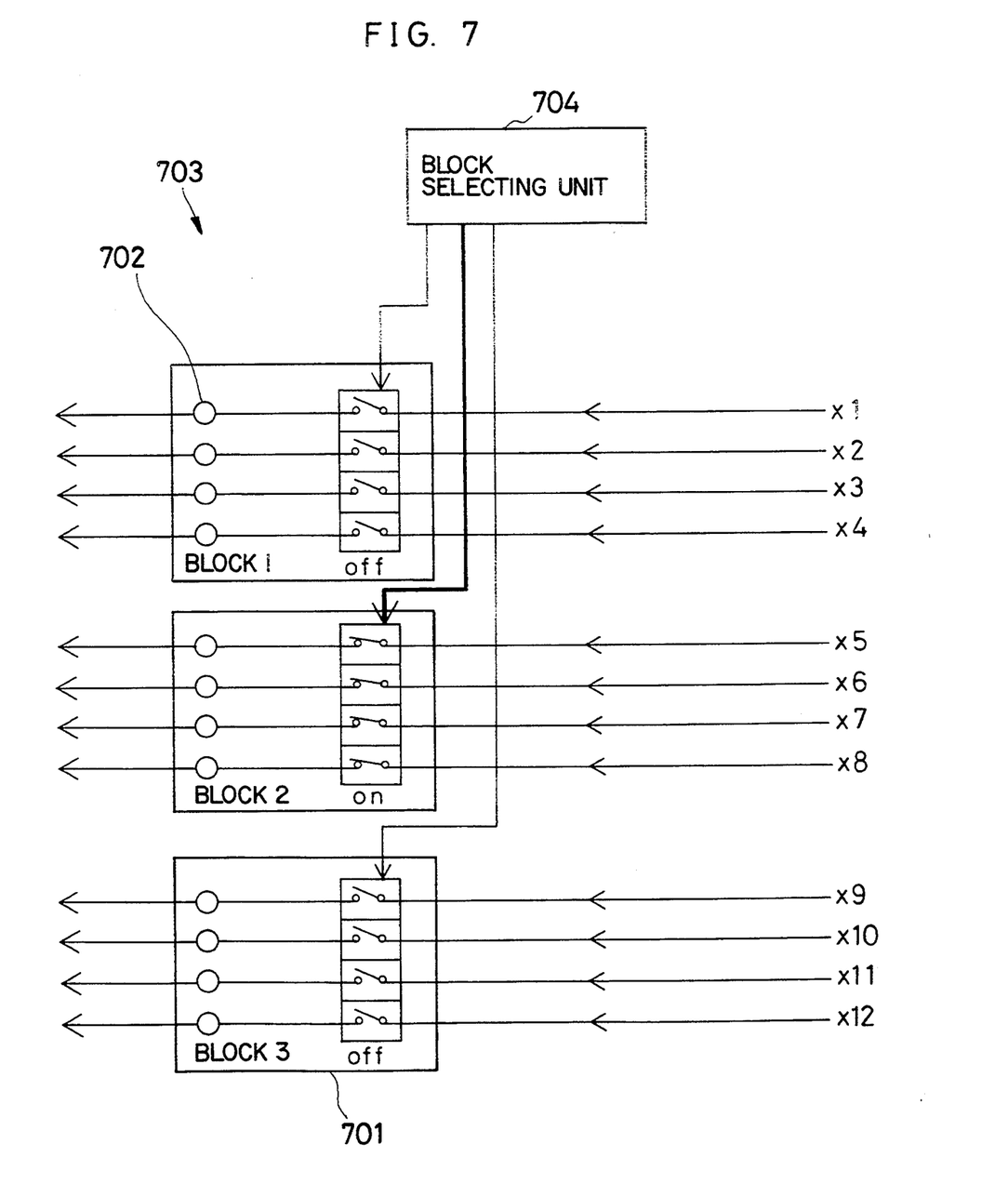
FIG. 7 is a block diagram showing the principle of a block control unit constituting the recursive neural net system according to the present invention, FIG. 8 schematically shows the arrangement of a neural net that performs block-sequential state updating according to one embodiment of the present invention.

The block control unit 605, which is the most significant feature of the neural net system among the constituent elements described above, will be explained below more specifically with reference to FIG. 7. The states of all the blocks are synchronously updated by the operations carried out in the preceding units from the optical computing unit 601 through the saturated linear computing unit 604. The resulting information is sent to the block control unit 605, where a signal is sent to a block to be selected from a block selecting unit 704, and values obtained as a result of the state updating are written into only memories in a memory unit 702 which correspond to the elements in the block selected by the block selecting unit 704. That is, a signal that turns on switches 703 is sent to the block selected, as shown in the figure, and after the information has been written into these memories, the information stored in all the memories in the memory unit 702 is fed back to the optical computing unit 601 as the state information for the subsequent step of the updating operation. Thus, it is possible to realize block-sequential updating in which synchronous updating and asynchronous updating are mixed together.

DESCRIPTION OF PREFERRED EMBODIMENTS

Figure 8:
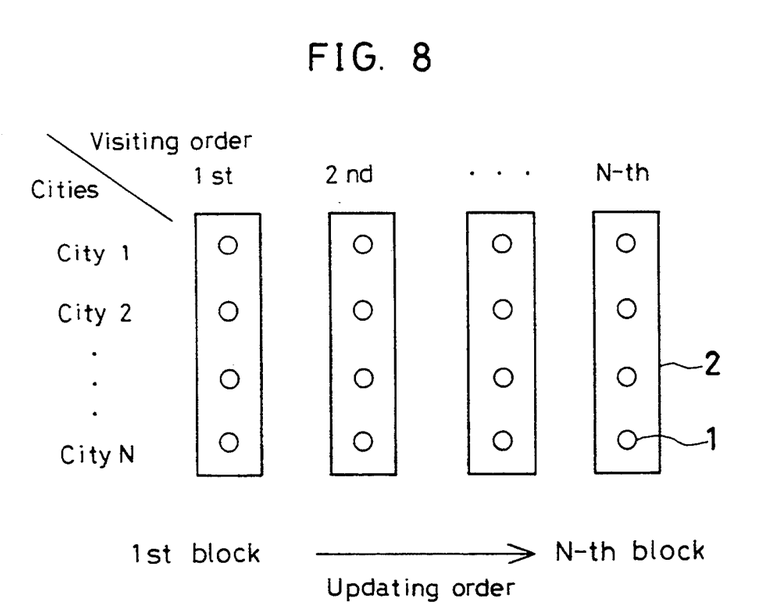

The present invention will be described below by way of an example in which it is applied to a traveling salesman problem. This is the problem of determining the shortest route to be taken by the salesman when performing a circular tour of N cities, calling at each city once only. It has been considered extremely difficult to obtain an optimal solution to this problem at a practical level because the computational time increases exponentially according to the number of cities, Let us plot the cities and the visiting order along the coordinate axes, respectively, and $N \times N$ elements 1 are arranged in a two-dimensional pattern and divided into N blocks 2, as shown in FIG. 8. The order in which the salesman should visit the cities is shown by the coordinates of the elements whose output is "1". Here, the following constrains are imposed on the operation of the network:

(1) Only one element outputs "1" in the same row.
(2) Only one element outputs "1" in the same column.
(3) The number of elements outputting "1" in a steady state is N.
(4) The total distance of the traveling route shall be minimized.

Assuming that the output of the element i is represented by $V_i$ and the distance between the cities x and y by $d_{xy}$, the above-described four constraints are expressed by the evaluation function F in the form of the following expression (21) (A, B, C and D are arbitrary constants):

$$F = \frac{A}{2} \sum_x \sum_i \sum_{j \neq i} V_{xi}V_{xj} + \frac{B}{2} \sum_i \sum_x \sum_{y \neq x} V_{xi}V_{yi} + \quad (21)$$

$$\frac{C}{2} \left( \sum_x \sum_i V_{xi} - N \right)^2 + \frac{D}{2} \sum_x \sum_{y \neq x} \sum_i d_{xy}V_{xi}(V_{yi+1} + V_{yi-1})$$

The energy function E may be expressed by $$E = -\frac{1}{2} \sum_x \sum_i \sum_y \sum_j W_{xiyj} V_{xi}V_{yj} - \sum_x \sum_i V_{xi} \theta_{xi} \quad (22)$$

By making a coefficient comparison between the evaluation function F of the expression (21) and the energy function E of the expression (22), the synaptic weight can be determined as shown by the following expression (23), where $\delta$ is Kronecker delta:

$$W_{xiyj} = -A\delta_{xy}(1-\delta_{ij}) - B\delta_{ij}(1-\delta_{xy}) - C - Dd_{xy}(\delta_{ji+1}+\delta_{ji-1}) \quad (23)$$

Next, a step-size for block-sequential state updating is determined. The minimum eigenvalue of the synaptic matrix in the k-th block is obtained as being B(1-N). Therefore, the step-size is determined to be smaller than 2/B(N-1) according to the expression (13).

In this case, it is guaranteed that the state of the network always converges with respect to any initial value. In this network, unlike the complete synchronous updating system, the step-size $\alpha_k$ can readily be determined independently of the information on the distance, which is advantageous in practical application.

The network arranged as described above operates in a direction in which all the constraints (1) to (4) are satisfied, and becomes stabilized at a point where the energy function reaches a minimum. The final point of convergence gives the minimal solution to this problem.

Figure 9:
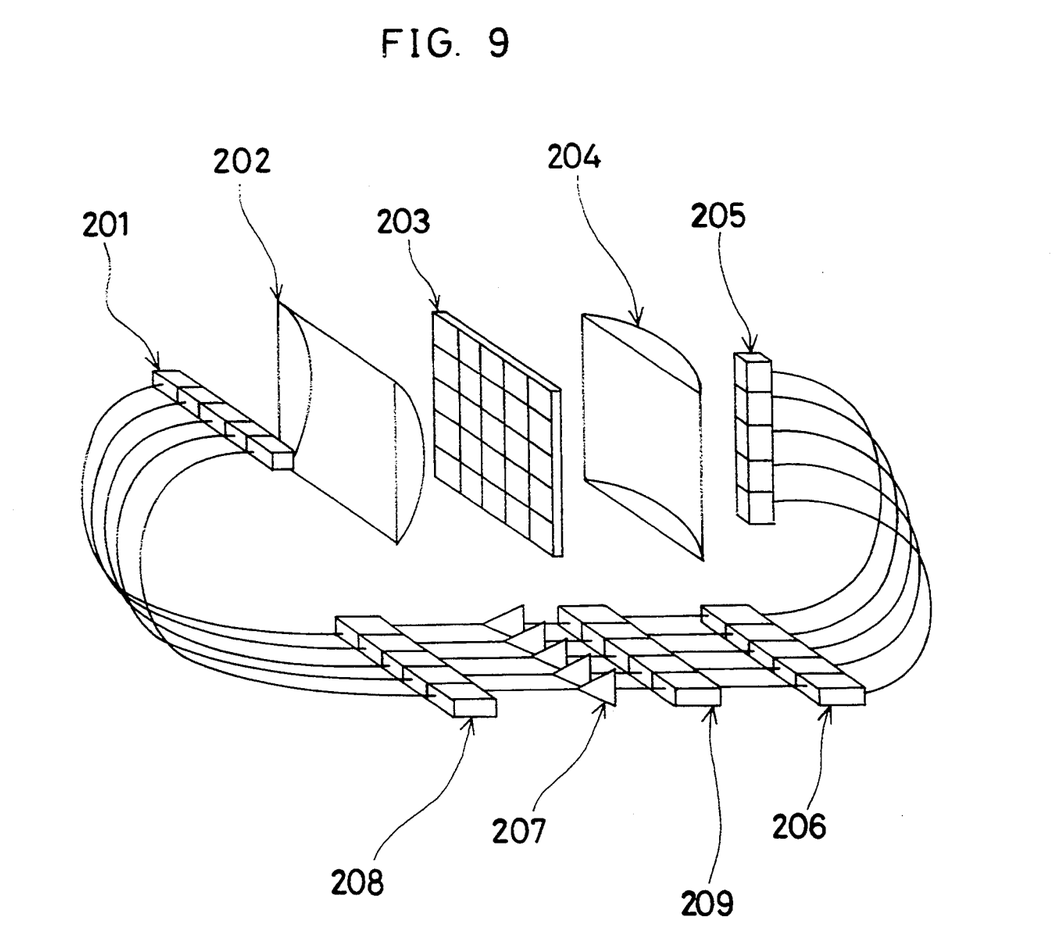
FIG. 9 shows a first embodiment of the neural net system according to the present invention.

FIG. 9 shows a first embodiment of the neural net system according to the present invention. In this embodiment, the optical computing unit comprises a light-emitting element array 201, lenses 202 and 204, a member 203 whose transmittance is partially changeable, e.g., a liquid crystal in this embodiment, and a photosensor array 205. A threshold processing unit 206 gives a threshold. A saturated linear computing unit 207 performs saturated linear transformation. A block control unit 208 includes a memory unit for storing the state, and a block selecting unit that selects a block to be updated. A coefficient multiplying unit 209 performs a multiplication operation using the step-size $\alpha_k$ shown in the expression (10).

The optical computing unit performs a vector matrix calculation in the same way as in the above-described prior art. The value $T_{ij}$ of the matrix displayed on the liquid crystal 203 is determined from W in the expression (12). The result of the vector matrix calculation is output from the photosensor array 205 and input to the threshold processing unit 206 where the values of the intensities of light detected are subjected to the threshold processing operation shown in the expression (10). The resulting values are multiplied by a coefficient $\alpha_k$ which satisfies the condition (13) in the coefficient multiplying unit 209, and a saturated linear calculation such as that shown in the expression (11) is performed in the saturated linear computing unit 207. Further, the values output from the saturated linear computing unit 207 are input to the block control unit 208. As has been described above, the block control unit 208 first selects a block whose internal state is to be updated, and writes the values input from the saturated linear computing unit 207 into only the memories for the elements in the block whose internal state is to be updated. In the other blocks, the memories are not rewritten, and the memory information remains in the preceding output state. Upon completion of the writing, the values stored in the memories for all the elements are output to the light-emitting element array 201. By continuing this updating operation, a block-sequential neural net system can be realized.

It should be noted that the threshold processing unit 206, the coefficient multiplying unit 209, the saturated linear computing unit 207, and the block control unit 208 are realized by using electric circuits.

Figure 10:
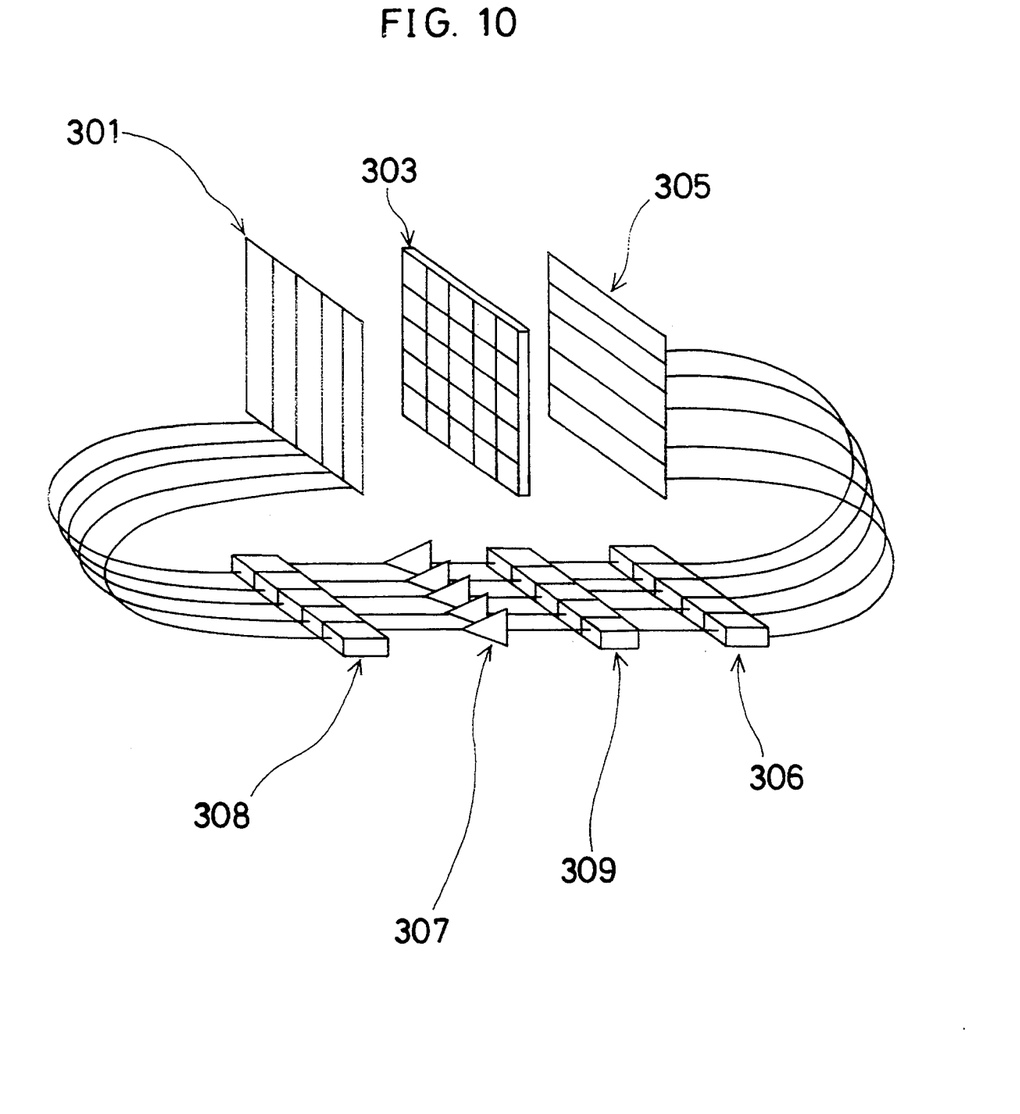
FIG. 10 shows a second embodiment of the neural net system according to the present invention.

FIG. 10 shows a second embodiment of the neural net system according to the present invention. In this embodiment, the optical computing unit is comprised of a light-emitting element array 301, a liquid crystal 303, and a photosensor array 305. The light-emitting element array 301 and the photosensor array 303 are arranged two-dimensionally in the directions i and j. The light-emitting element array 301 is arranged to output the same values for the direction i, whereas the photosensor array 305 is arranged to sum up the quantities of light incident thereon for the direction j. Thus, the vector matrix calculation can be performed without the need for the lens systems 202 and 204, described in connection with FIG. 9. Then, the information is transmitted through a threshold processing unit 306, a coefficient multiplying unit 309, a saturated linear computing unit 307, and a block control unit 308 in the same way as in the first embodiment. In this way, it is possible to realize a block-sequential neural net system.

Figure 11:
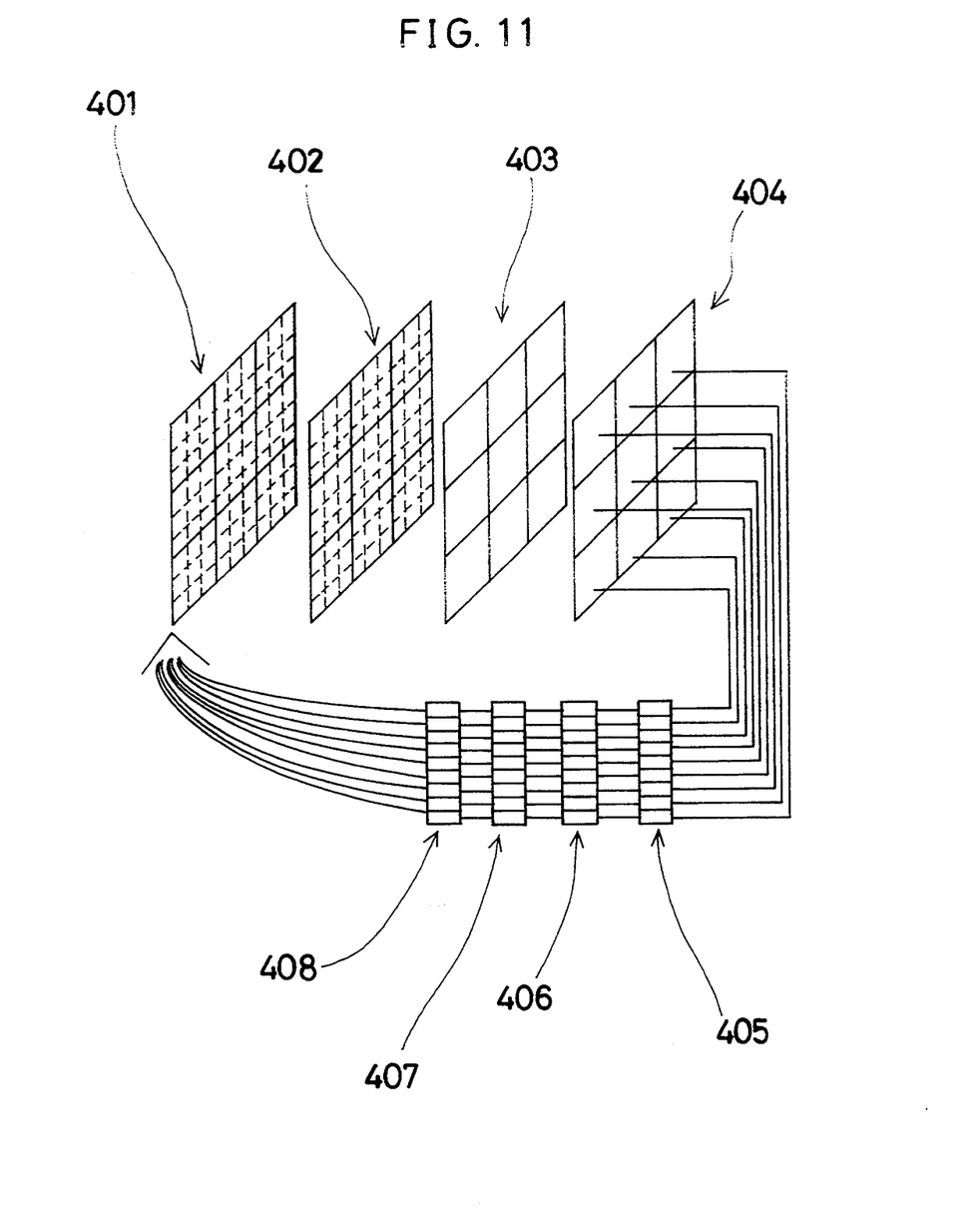
FIG. 11 shows a third embodiment of the neural net system according to the present invention.

FIG. 11 shows another embodiment designed to process characters, images, etc. in the state of being two-dimensional patterns in recognition or other similar process. The optical computing unit in this embodiment is comprised of a light-emitting element array 401, a member 402 whose transmittance is partially changeable, e.g., a liquid crystal, a lens system 403 including a plurality of lenses, and a photosensor array 404.

Figure 12A:
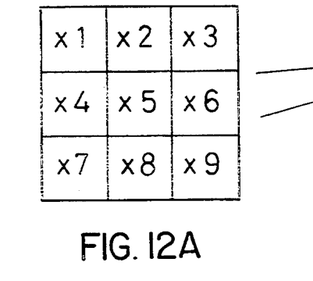
FIG. 12 shows a vector pattern and a weight matrix pattern.
Figure 12B:
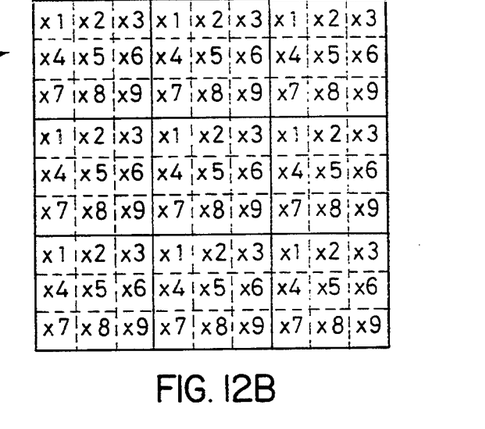
Figure 12C:
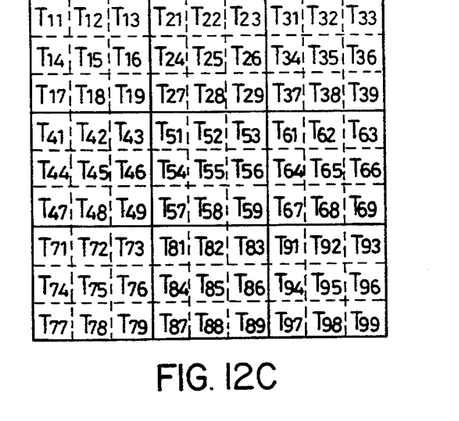

The embodiment will be explained by way of an example in which the number of neurons is 9. Let us assume that 9 neuron state vector components xi are two-dimensionally arranged as shown in FIG. 12A. To make it possible to perform a vector matrix calculation such as that shown by the expression (7) with the state vector left in the illustrated pattern, a pattern, in which the 9 neuron vector components are arranged in a $3 \times 3$ matrix as shown in FIG. 12B, is displayed on the light-emitting element array 401. The liquid crystal 402 is also divided into $9 \times 9$ elements, and weights $T_{ij}$ are assigned to the respective elements in such a manner as to form one block for each i component, as shown in FIG. 12C. The lens system 403 is arranged to condense light emitted from the respective blocks of the liquid crystal 402 on the photosensor array 404. Thus, the quantities of light detected by the photosensor array 404 are subjected to a vector matrix calculation similar to that in the case of the one-dimensional pattern by the expression (7). Then, the values obtained by the calculation are subjected to block-sequential state updating through the above-described threshold processing unit, coefficient multiplying unit, saturated linear computing unit and block control unit. Further, the results of the state updating are output to the light-emitting element array 401 in the form of a pattern such as that shown in FIG. 12B. In this way, it is possible to form a block-sequential neural net system capable of handling two-dimensional input information as it is.

Figure 13:
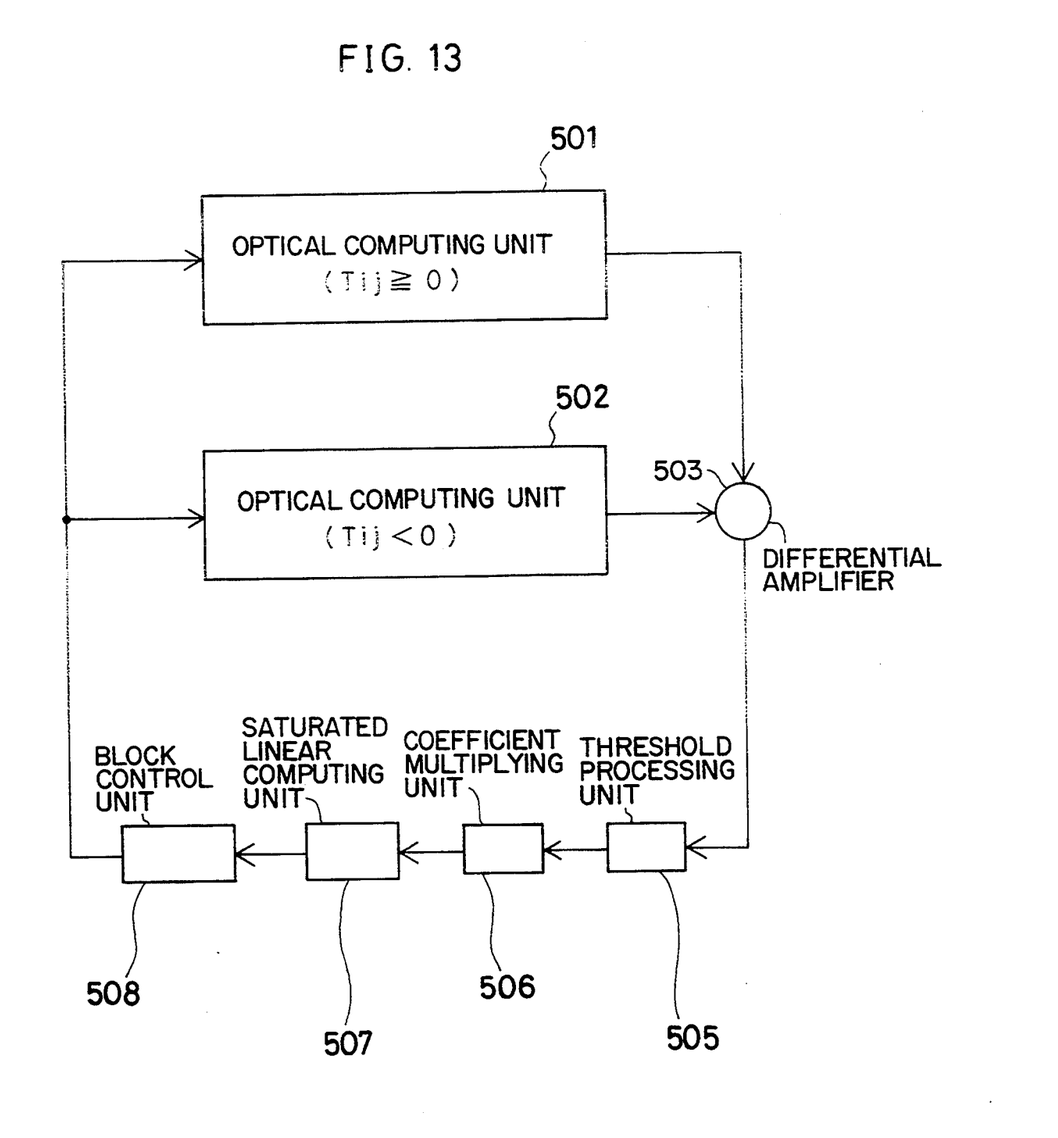
FIG. 13 is a block diagram showing one example of the arrangement of a system having two optical computing units.

Although the foregoing embodiments are all applicable under the condition of $T_{ij} \geq 0$, it should be noted that the present invention can readily cope with a system in which both positive and negative values are used for $T_{ij}$ by calculating two different kinds of value corresponding to $T_{ij} \geq 0$ and $T_{ij} < 0$ in two optical computing units 501 and 502, respectively, as shown in FIG. 13, subtracting the values obtained in the respective photosensor arrays from each other in a differential amplifier 503, and using the resulting values for block-sequential state updating.

Although in the foregoing embodiments a plurality of lines are used for wiring from the photosensor array to the light-emitting element array in order to effectively utilize the advantage of parallelism, if the processing speed may be sacrificed, the wiring can be minimized by executing time-series processing with a single line, as a matter of course.

Further, if each block consists of one neuron, the arrangement becomes similar to that of an asynchronous model. Therefore, an asynchronous model can be realized with the system of the present invention if it is allowable to overlook the disadvantage that the processing time lengthens due to an increase in the number of times of updating required.

As will be clear from the foregoing description, the present invention provides a recursive neural net including processing elements each having a linear saturated function as an input/output function, in which the elements are divided into a plurality of blocks. When the states of the elements are asynchronously updated block by block while being synchronously updated within each block, the convergence of energy can be ensured for any symmetric synaptic matrix. Therefore, it is possible to enlarge the range of application to optimization problems. Moreover, since a continuous valued model that performs block-sequential updating is realized, it becomes possible to solve various kinds of optimization and recognition problem without generating an oscillating solution. In addition, since the system of the present invention is arranged to process the vector matrix calculation part of this model by using light, the convergence to the solution can be reached at high speed.

What we claim is:

1. A recursive neural net, comprising:
a block control unit for performing selection of a block to be updated and state updating therefor, thereby forming a recursive neural net including processing elements each having a linear saturated function as an input/output function, in which said processing elements are divided into a plurality of blocks, and states of said processing elements are asynchronously updated within each block,
an optical computing unit for optically performing a vector matrix calculation, wherein a conversion given by $A^{(k)}$ below is performed on signals of $x^{(j)}(t+1)$ and $x^{(j)}(t)$:

$$A^{(k)} = \sum_{j=1}^{k-1} W_{kj}x^{(j)}(t+1) + \sum_{j=k}^{m} W_{kj}x^{(j)}(t)$$

where $x = (x_1 \ldots x_i, \ldots, X_n)^T$ ($0 \leq x_i \leq 1$) represents a state vector expressing a state of each individual neuron in said neural net, $x^{(k)}(k=1, \ldots, m)$ represents a number m of subvectors expressing the states of said neurons included in each of said blocks, and $W_{kj}$ represents a submatrix of synaptic weights matrix of a link connecting a j-th block to a k-th block;
a threshold processing unit for performing a threshold processing operation, wherein a conversion given by $B^{(k)}$ below is preformed on the signals expressed by $A^{(k)}$ above:

$$B^{(k)} = A^{(k)} + \theta^{(k)}$$

where $\theta^{(k)}$ represents subvectors of a threshold vector $$\theta = [\theta^{(1)T}, \theta^{(2)T}, \ldots, \theta^{(m)T}]^T;$$

a coefficient multiplying unit for performing a step-size processing operation, wherein a conversion given by $C^{(k)}$ below is performed on the signals expressed by $B^{(k)}$ above:

$$C^{(k)} = \alpha_k B^{(k)}$$

where $\alpha_k$ is a step-size for updating of the k-th block, and is set so as to satisfy the following expression:

$$\frac{2}{\alpha_k} > \max[-\lambda_k, 0] (k = 1, \ldots, m);$$

a saturated linear computing unit for performing a saturated linear function operation, wherein a conversion given by $D^{(k)}$ below is performed on the signals expressed by $C^{(k)}$ above:

$$D^{(k)} = S(X^{(k)}(t) + C^{(k)})$$

where S is a non-linear operator causing a linear saturated function Sat to operate for each vector component:

$$\begin{cases} Sat(x) = 0 \text{ if } x < 0 \\ Sat(x) = x \text{ if } 0 \leq x \leq 1 \\ Sat(x) = 1 \text{ if } x > 1 \end{cases}; \text{ and}$$

wherein said updating is performed by a conversion as ABCD.

2. A recursive neural net according to claim 1, wherein optimization is performed by obtaining a minimal point of an energy function, defined by the following expression, with respect to a synaptic matrix W:

$$E(t) = -\frac{1}{2} x^T(t)Wx(t) - x^T(t)\theta .$$

3. A recursive neural net according to claim 2, wherein said block control unit selects a block having an internal state which is to be updated, writes values input from said saturated linear computing unit into memories only for the processing elements in the block having said internal state to be updated without rewriting memories in the other blocks, and outputs the values written in the memories for all the processing elements to a light-emitting element array.

4. A recursive neural net according to claim 2, wherein said optical computing unit includes a light-emitting element array, a member having a partially changeable transmittance and a photosensor array.

5. A recursive neural net according to claim 4, wherein a lens array is disposed between said member and said photosensor array.

6. A recursive neural net according to claim 4, wherein lenses are disposed respectively between said light-emitting element array and said member and between said member and said photosensor array.

7. A neural net system according to claim 1, wherein said optical computing unit includes a light-emitting element array, a member having a transmittance that is partially changeable, and a photosensor array.

8. A neural net system according to claim 7, wherein a lens array is disposed between said member and said photosensor array.

9. A neural net system according to claim 7, wherein lenses are disposed respectively between said light-emitting element array and said member and between said member and said photosensor array.

10. A neural net system according to claim 1, wherein said block control unit first selects a block whose internal state is to be updated, writes values input from said saturated linear computing unit into memories only for the processing elements in the block whose internal state is to be updated without rewriting memories in the other blocks, and outputs the values written in the memories for all the processing elements to a light-emitting element array.

11. A recursive neural net according to claim 1, wherein said optical computing unit includes a light-emitting element array, a member having a partially changeable transmittance, and a photosensor array.

12. A recursive neural net according to claim 11, wherein a lens array is disposed between said member and said photosensor array.

13. A recursive neural net according to claim 11, wherein lenses are disposed respectively between said light-emitting element array and said member and between said member and said photosensor array.

14. A recursive neural net according to claim 19, wherein said block control unit selects a block having an internal state which is to be updated, writes values input from said saturated linear computing unit into memories only for the processing elements in the block which has the internal state to be updated without rewriting memories in the other blocks, and outputs the values written in the memories for all the processing elements to a light-emitting element array.

15. A neural net system, comprising:
a block control unit for performing selection of a block to be updated and state updating therefor, thereby forming a recursive neural net including processing elements each having a linear saturated function as an input/output function, in which said processing elements are divided into a plurality of blocks,
an optical computing unit for optically performing a vector matrix calculation, wherein a conversion given by $A^{(k)}$ below is performed on signals of $x^{(j)}(t+1)$ and $x^{(j)}(t)$:

$$A^{(k)} = \sum_{j=1}^{k-1} W_{kj} x^{(j)}(t+1) + \sum_{j=k}^{m} W_{kj} x^{(j)}(t)$$

where $x=(x_1, \ldots x_i, \ldots, x_n)^T (0 \leq x_i \leq 1)$ represents a state vector expressing a state of each individual neuron in said neural net, $x^{(k)}(k=1,\ldots,m)$ represents a number m of subvectors expressing the states of said neurons included in each of said blocks, and $W_{kj}$ represents a submatrix of synaptic weights matrix of a link connecting a j-th block to a k-th block;
a threshold processing unit for performing a threshold processing operation, wherein a conversion given by $B^{(k)}$ below is performed on the signals expressed by $A^{(k)}$ above:

$$B^{(k)} = A^{(k)} + \theta^{(k)}$$

where $\theta^{(k)}$ represents subvectors of a threshold vector $$\theta = [\theta^{(1)T}, \theta^{(2)T}, \ldots, \theta^{(m)T}]^T;$$

a coefficient multiplying unit for performing step-size processing operation, wherein a conversion given by $C^{(k)}$ below is performed on the signals expressed by $B^{(k)}$ above:

$$C^{(k)} = \alpha_k B^{(k)}$$

where $\alpha_k$ is a step-size for updating the k-th block and is set so as to satisfy the following expression:

$$\frac{2}{\alpha_k} > \max[-\lambda_k, 0] (k = 1, \ldots, m)$$

a saturated linear computing unit for performing a saturated linear function operation, wherein a conversion given by $D^{(k)}$ below is performed on the signals expressed by $C^{(k)}$ above:

$$D^{(k)} = S(X^{(k)}(t) + C^{(k)})$$

where S is a non-linear operator causing a linear saturated function Sat to operate for each vector component:

$$\begin{cases} Sat(x) = 0 \text{ if } x < 0 \\ Sat(x) = x \text{ if } 0 \leq x \leq 1 \\ Sat(x) = 1 \text{ if } x > 1 \end{cases}; \text{ and}$$

states of said processing elements in said block to be updated being synchronously performed by said saturated linear function to be updated, while states of said processing elements in a block other than said block to be updated is not updated.

* * * * *